(12) United States Patent
Armistead

(10) Patent No.: US 10,087,046 B2
(45) Date of Patent: Oct. 2, 2018

(54) INTELLIGENT BUILDING SYSTEM FOR ALTERING ELEVATOR OPERATION BASED UPON PASSENGER IDENTIFICATION

(71) Applicant: OTIS ELEVATOR COMPANY, Farmington, CT (US)

(72) Inventor: Jason R. Armistead, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 21 days.

(21) Appl. No.: 15/291,646

(22) Filed: Oct. 12, 2016

(65) Prior Publication Data

US 2018/0099840 A1 Apr. 12, 2018

(51) Int. Cl.
| | |
|---|---|
| *B66B 1/28* | (2006.01) |
| *G05B 15/00* | (2006.01) |
| *B66B 3/00* | (2006.01) |
| *G05B 19/042* | (2006.01) |
| *B66B 1/46* | (2006.01) |
| *B66B 1/24* | (2006.01) |

(52) U.S. Cl.
CPC ............ *B66B 3/008* (2013.01); *B66B 1/2408* (2013.01); *B66B 1/468* (2013.01); *G05B 19/042* (2013.01); *B66B 2201/223* (2013.01); *G05B 2219/25011* (2013.01); *G05B 2219/45014* (2013.01)

(58) Field of Classification Search
CPC ......... H04W 4/08; H04W 84/18; H04W 4/02; H04W 4/023; H04W 4/70; H04W 4/80; H04W 4/021; H04W 4/025; H04W 4/04; H04W 4/21; H04W 64/00; B66B 1/468; B66B 1/2408; B66B 1/3461; B66B 2201/103; B66B 2201/223
See application file for complete search history.

(56) References Cited

U.S. PATENT DOCUMENTS

| | | |
|---|---|---|
| 5,955,710 A | 9/1999 | Difranza |
| 6,288,688 B1 | 9/2001 | Hughes et al. |
| 6,341,668 B1 | 1/2002 | Fayette et al. |
| 6,349,797 B1 | 2/2002 | Newville et al. |
| 6,578,675 B2 | 6/2003 | Wilson et al. |
| 7,000,735 B2 | 2/2006 | Meyer |
| 7,266,505 B2 | 9/2007 | Friedli et al. |
| 7,319,966 B2 | 1/2008 | Friedli et al. |
| 7,319,967 B2 | 1/2008 | Meyer |

(Continued)

FOREIGN PATENT DOCUMENTS

| | | |
|---|---|---|
| CN | 103523620 A | 1/2014 |
| WO | 225624 A1 | 3/2002 |

*Primary Examiner* — Marlon Fletcher
(74) *Attorney, Agent, or Firm* — Cantor Colburn LLP

(57) ABSTRACT

The disclosure herein includes a method for controlling elevators by an intelligent building system. The method includes receiving, by the intelligent building system, elevator calls initiated by passengers. Each elevator call can include a passenger identification corresponding to a passenger initiating the elevator call. The method further includes procuring passenger preference information based on the passenger identifications in response to the elevator calls and grouping the passengers with respect to the passenger preference information to produce passenger groups. The method further includes controlling the elevators to collect the passenger groups.

8 Claims, 5 Drawing Sheets

(56) References Cited

U.S. PATENT DOCUMENTS

| | | | |
|---|---|---|---|
| 7,319,968 B2 | 1/2008 | Friedli et al. | |
| 2008/0004950 A1 | 1/2008 | Huang et al. | |
| 2008/0306961 A1 | 12/2008 | Pineau et al. | |
| 2009/0057069 A1 | 3/2009 | Boggess | |
| 2010/0122174 A1 | 5/2010 | Snibbe et al. | |
| 2011/0258044 A1 | 10/2011 | Kargupta | |
| 2014/0351337 A1 | 11/2014 | Pal et al. | |
| 2015/0019340 A1 | 1/2015 | El-Masri et al. | |
| 2015/0210505 A1* | 7/2015 | Fujiwara | B66B 1/468 187/381 |
| 2015/0368067 A1* | 12/2015 | Tang | H04B 5/0025 187/380 |
| 2016/0122157 A1* | 5/2016 | Keser | B66B 1/468 187/388 |
| 2016/0376124 A1* | 12/2016 | Bunter | B66B 1/468 187/247 |

\* cited by examiner

INTELLIGENT BUILDING SYSTEM FOR ALTERING ELEVATOR OPERATION BASED UPON PASSENGER IDENTIFICATION

BACKGROUND

Elevators provide content to passengers during each use. Unfortunately, this content is either completely static, such as posters, or is pre-selected without regard to who is riding the elevator, such as a news feed via a display. For example, when various multimedia systems for elevators provide content, the content is typically provided by a third party according to preferences specified by a building owner (so the building owner and the passengers have no direct control).

In addition, destination dispatching systems for elevators typically assign passengers to elevators using algorithms to optimize service (e.g., optimize waiting time, round trip time, number of stops, etc.). Passengers in elevators of destination dispatching systems therefore have a lack of choice of who they ride with. For instance, unless passengers are going to the same floor and/or are assigned to the same elevator, the destination dispatching systems do not guarantee that passengers with similar interest or with common relations will ride in the same elevator. When passengers are not correctly paired, their ride experience can be negatively impacted. Further, because the destination dispatching systems typically optimize speed of service, passengers are assigned elevators regardless of the content provided in the assigned elevator. Therefore, the destination dispatching systems force passenger to receive content in which they may have no interest, which can create a negative ride experience.

The disclosure relates generally to an intelligent building system utilizing passenger identification to select and provide multimedia content and to group passengers.

BRIEF DESCRIPTION

In accordance an embodiment, a method of controlling one or more elevators by an intelligent building system is provided. The method comprises receiving, by the intelligent building system comprising a processor coupled to a memory, one or more elevator calls initiated by one or more passengers, each elevator call comprising a passenger identification corresponding to a passenger initiating the elevator call; procuring, by the intelligent building system in response to each of the one or more elevator calls, passenger preference information based on each passenger identification; grouping, by the intelligent building system, the one or more passengers with respect to the passenger preference information to produce one or more passenger groups; and controlling, by the intelligent building system, the one or more elevators to collect the one or more passenger groups.

In accordance with another embodiment or the method embodiment above, the method can comprise receiving an opt-in input from each passenger.

In accordance with another embodiment or any of the method embodiments above, the method can comprise filtering the passenger preference information based on a list of pre-approved content or restricted information.

In accordance with another embodiment or any of the method embodiments above, the passenger preference information can be procured from one or more social media sources based on a mining operation.

In accordance with another embodiment or any of the method embodiments above, the method can comprise procuring content with respect to the passenger preference information; and controlling one or more output devices of the intelligent building system to provide the content to the one or more passenger groups in conjunction with controlling the one or more elevators to collect the one or more passenger groups.

In accordance an embodiment, a method of controlling one or more output devices by an intelligent building system. The method comprises receiving, by the intelligent building system comprising a processor coupled to a memory, one or more elevator calls initiated by one or more passengers, each elevator call comprising a passenger identification corresponding to a passenger initiating the elevator call; procuring, by the intelligent building system in response to each of the one or more elevator calls, passenger preference information based on each passenger identification; procuring, by the intelligent building system, content with respect to the passenger preference information; and controlling, by the intelligent building system, the one or more output devices to provide the content.

In accordance with another embodiment or the method embodiment above, the method can comprise receiving an opt-in input from each passenger.

In accordance with another embodiment or any of the method embodiments above, the method can comprise filtering the passenger preference information based on a list of pre-approved content or restricted information.

In accordance with another embodiment or any of the method embodiments above, the passenger preference information can be procured from one or more social media sources based on a mining operation.

In accordance with another embodiment or any of the method embodiments above, the method can comprise grouping the one or more passengers with respect to the passenger preference information to produce one or more passenger groups; and controlling one or more elevators of the intelligent building system to collect the one or more passenger groups in conjunction with the controlling of the one or more output devices to provide the content Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

In an embodiment, an intelligent building system utilizes passenger credentials or passenger identifications (passenger IDs) to select and provide multimedia content and to group passengers. Passenger IDs can be acquired in real-time via, for example, security credentials, smartphones, face-recognitions, etc. The intelligent building system can then link each passenger ID with one or more social network IDs and utilize the one or more social network IDs to analyze social network data. The social network data can be further utilized by the intelligent building system for each passenger to acquire passenger grouping suggestions and content preference suggestions. Passenger grouping suggestions can be suggestions based on common passenger interests derived from the social network data that enable the grouping of likeminded passengers and/or the separating of incompatible passengers. Content preference suggestions can be multimedia content relevant to passenger interests derived from the social network data.

Figure 1:
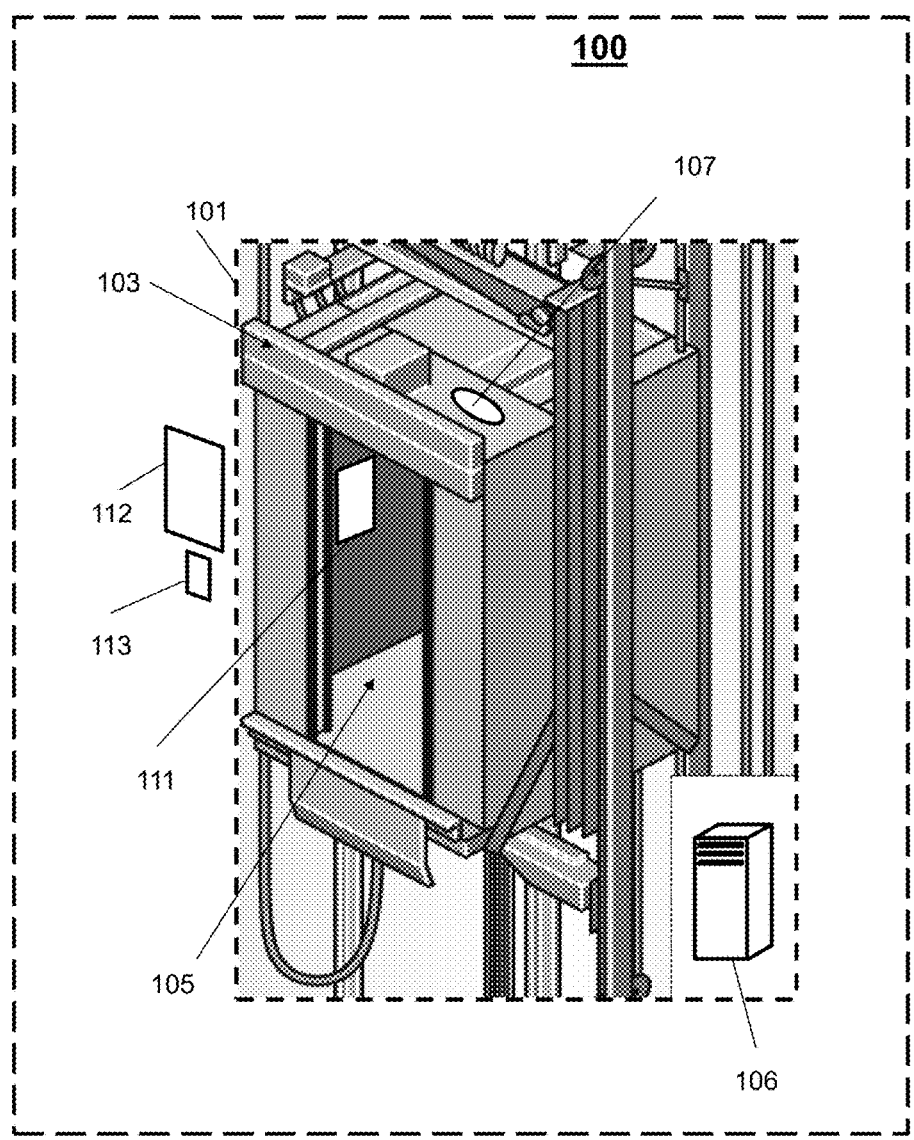
FIG. 1 illustrates an example of a schematic of an intelligent building system according to one embodiment.

Referring now to FIG. 1, an example schematic of an intelligent building system 100 is shown. As shown in FIG. 1, the intelligent building system 100 includes an elevator sub-system 101. The elevator sub-system 101 comprises an elevator 103 that includes an elevator cab 105, a detector 107, a computing device 106 (e.g., the central server), and an internal output device 111. Further, the intelligent building system 100 includes an external output device 112 and an interface 113 (which can be part of a passenger destination entry terminal).

The intelligent building system 100 and elements therein may take many different forms and include multiple and/or alternate components and facilities. The intelligent building system 100 is an example and is not intended to suggest any limitation as to the scope of use or operability of embodiments described herein (indeed additional or alternative components and/or implementations may be used). For example, the intelligent building system 100 can include one or more passenger destination entry terminals (each of which can include a processor, a memory, a display, a keypad and/or touchscreen) that communicate to a central server via an Ethernet network (including one or more Ethernet switches).

The intelligent building system 100 may implement operations and/or communicate signals between the elevator sub-system 101 and elements therein, the external output device 112, the interface 113, and other systems and sub-systems that assist passengers of the elevator 103. Examples of these operations and/or signals may include generating an elevator call (e.g., a hall call), receiving an elevator call (e.g., from a smartphone), canceling an elevator call, detecting/identifying passengers, determining/identifying future passengers, deriving passenger grouping suggestions and/or content preference suggestions, selecting multimedia content based on content preference suggestions, utilizing social networking to select multimedia content, providing multimedia content, assigning passengers, grouping passengers based on passenger grouping suggestions, grouping passengers based profile information or activity on social media, etc. Further, the communications of the intelligent building system 100 can be encrypted, e.g., a protocol such as hypertext transfer protocol secure (HTTPS) for communication to a mobile browser or an advanced encryption standard (AES) for communication to an output device 111 and/or 112. Further, the intelligent building system 100 can utilize the same protocols, and even hardware, for its components as are used by a passenger and a user device of the passenger to leverage cost and implementation benefits.

The elevator sub-system 101 can comprise electromechanical arrangements (e.g., one or more controllers and/or computing devices, such as computing device 106, that controls at least one motor) that control speed, position, and door operation of an elevator or bank of elevators (e.g., elevator 103). For example, an elevator controller can comprise computing devices, each of which specifically manages group control, elevator operational control, elevator motion control, drive motor and brake control, door control, safety subsystem, fixtures, etc. The elevator cab 105 has a finite capacity to hold occupants, which include objects and people, based on the dimensions of the elevator and also on the rated mechanical load capacity (which can determined by many factors including the hoisting ropes/belts, safety mechanisms, etc.).

The computing device 106 of the elevator sub-system 101 may control and monitor (or communicate with other systems and sub-systems through any communication or network communication technologies that can control and monitor) the elevator 103, the elevator cab 105, and the detector 107, such that the elevator sub-system 101 may operate the elevator or bank of elevators as a passenger and a passenger device of the passenger interacts with the intelligent building system 100 (e.g., makes hall calls or requests occupancy information). Examples of communication technologies include wired technologies, electromagnetic, e.g., radio frequency ("RF"), magnetic (near field communication, "NFC"), short wave radio, proximity systems, Bluetooth Low Energy (BLE) beacons, etc. Further schematics of the computing device 106 and communication technologies are described herein with respect to the sysplex 500 of FIG. 5. The computing device is representative of one or more devices that can control and monitor the elevator sub-system 101 and is not limiting.

In an embodiment, the computing device 106 can implement the operations and signals discussed herein, along with receiving an Opt-In input (i.e., optioned-in as described herein), receiving a destination, receiving a passenger identification, procuring passenger grouping suggestions and/or content preference suggestions, procuring content, and grouping passengers. The computing device 106 can also implement a bypass feature (that bypasses subsequent elevator calls), communicate with devices external to the intelligent building system 100, perform additional reliability and convenience communication operations, etc. Note that the computing device 106 can be included in and part of the intelligent building system 100 and elevator sub-system 101 as shown in FIG. 1, can be integrated with the elevator 103 itself, and can be included external to the intelligent building system 100 and/or elevator sub-system 101. Further, note that operations implemented by the computing device 106 can be implemented by one or more computing devices.

The detector 107 can be any sensor that detects events or changes in the elevator cab 105 and that provides a corresponding output. For instance, the detector can be an occupied-area estimation device that identifies occupancy information of the elevator cab 105 and outputs the occupancy information as an electrical or optical signal to the computing device 106, one of the output devices 111 and 112, etc. The occupancy information can be expressed as an image, but in alternate embodiments can be expressed as text or through mathematics, e.g., a table of passengers. Examples of a detector 107 include cameras, infrared sensors, motion sensors, radar, sonar, ultrasound, depth sensors, microphones, etc. Further, detector 107 may be connected to or communicate with the computing device 106, one of the output devices 111 and 112, or other device through either wired (traveling cable) or wireless communication. Whether wired or wireless communication, additional privacy protection can be implemented so that any information communicated is protected from intrusion.

The output devices 111 and 112 can be any technology for presentation of content (and information). Examples of any output device or technology for presentation of content include speakers, light emitting diode displays, liquid crystal displays, flat panel displays, etc. The content can comprise single instances or combinational information provided by one or more different content forms, such as text, audio, images, animation, video, and interactive content.

An example of the content is multimedia content. In an embodiment, the internal output device 111 includes an electronic audio/visual device configured on an internal wall of the elevator cab 105 (e.g., as shown in FIG. 1) that outputs the multimedia content (which can be transmitted electronically from the computing device 106 and/or an external media or other server/device external to the computing device 106) for reception by one or more current passengers. In an embodiment, the external output device 112 includes an electronic audio/visual device configured near an entry way of the elevator 103 that outputs the multimedia content, such as advertisements, television shows, music, instructions, news, weather, etc., transmitted electronically from the computing device 106 for reception by future/waiting passengers. In an embodiment, the output devices 111 and 112 can be displays of user devices of current and future passengers (e.g., display of a smartphone or tablet) that are in communication with the intelligent building system 100. Note that output devices 111 and 112 can be located at one or more floors, such as a lobby and/or other busy floors where passengers congregate (e.g., cafeteria, sky-lobbies, meeting rooms, restaurants, etc.). Also, note that some intelligent building systems 100 may forgo the use of the output devices 111 and 112 (e.g., intelligent building systems 100 that only perform passenger grouping as described herein).

The interface 113 can be any shared boundary across which two separate entities exchange information. The exchange can be between software, computer hardware, peripheral devices, passengers (current or future), and combinations of thereof. In turn, embodiments of the interface 113 can include barcodes, two-dimensional barcodes (e.g., as a quick response code), near field communications transmitters, radio-frequency identification transmitters, etc., which in response to a user device scanning or interacting with the interface 113 causes the intelligent building system 100 to provide the multimedia content via the output devices 111 and 112. Further, the interface 113 may also be integrated with the output devices 111 and 112, such as a touchscreen (e.g., screen and keypad combinations and/or touchscreen and keypad combinations) that can display the multimedia content and accept passenger inputs.

Figure 2:
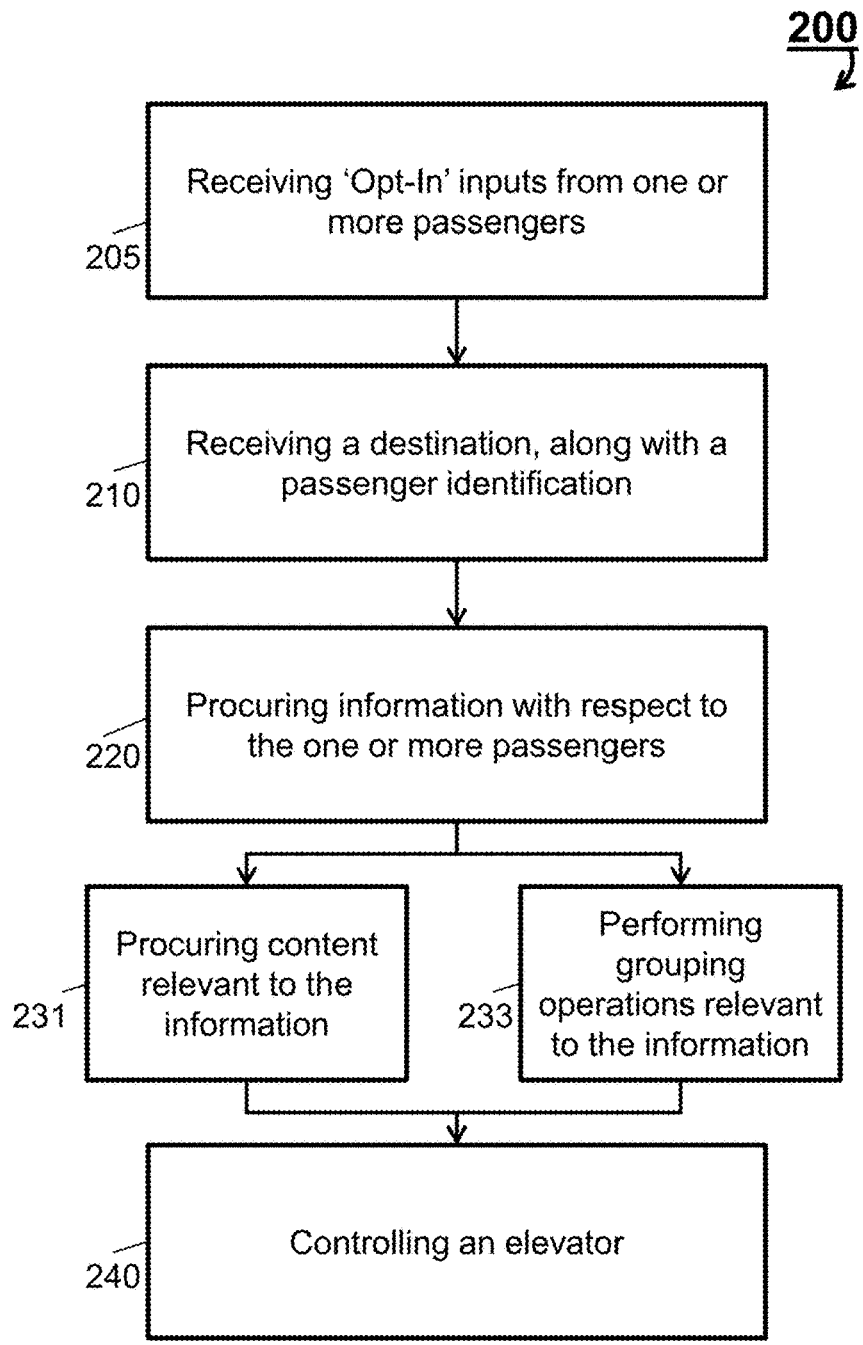
FIG. 2 illustrates a process flow for utilizing passenger identification according to one embodiment.

Operations of the intelligent building system 100 will now be described. An example of a set of operations by the intelligent building system 100 will be described with reference to FIG. 2, which illustrates a process flow 200.

Process flow 200 begins at block 205 where the intelligent building system 100 receives one or more inputs indicating an Opt-In (i.e., optioned-in) by one or more passengers. An Opt-In, in general, is an express permission by a passenger via text, email, option selection, or other direct message to allow the intelligent building system 100 to perform automatic grouping and/or content providing.

In an embodiment, a passenger being issued a security card can be associated with a passenger ID and can include an automatic Opt-In (by accepting the security card, the passenger automatically options into grouping and/or content providing). The security card could be linked to the passenger ID of an employee database by building management staff during the automatic Opt-In. In turn, the passenger can link the passenger ID to one or more social networks (i.e., one or more social network/media ID(s) by utilizing a computer, a user interface device, and/or a smartphone/tablet (which can also serve as a security credential). Each social network/media ID can be an identification associated with databases or services external to the computing device, such as a unique user ID or e-mail address. The computing device 106 can maintain a table that links/matches the passenger IDs with the social network/media IDs. Further, the table can include credentials associated with the passenger ID, such as a passenger name, address, phone number, and the like.

In another embodiment, the Opt-In can include a sign-up operation to utilize services of the intelligent building system 100. For instance, when a passenger downloads an application onto a smartphone (or other mobile device), an initial configuration of the application can enable the passenger to grant permissions to call elevators in certain building(s) for a certain time while they are a tenant, employee, visitor, etc. and have a valid reason to do so (e.g., to prevent abuse by unauthorized users who may have the smartphone app but for other buildings). Further, the passenger can link a passenger ID associated with the application to one or more social networks or the like.

In another embodiment, the intelligent building system 100 can also perform the automatic grouping and/or content providing passengers who do not Opt-In, using other factors relating to building usage, tenancy, etc. For example, the intelligent building system 100 can attempt to group passengers during up-peak times to maximize a number of passengers going to the same floor, and thus, reduce a number of stops the elevator 1-3 must make before returning to an elevator lobby.

At block 210, the intelligent building system 100 receives a destination, along with a passenger ID. The destination can be a floor of a building that the elevator 103 provides transportation to and can be designated by a manual or an automatic elevator call. In an embodiment, the destination can be one or more communications carrying passenger IDs received by the computing device of 106. The one or more communications can be discrete elevator calls. Discrete elevator calls include, but are not limited to, an elevator call from a smartphone (e.g., the smartphone to cell tower to cloud server to cell tower to elevator controller; note that a global positioning system can be used to identify the smartphone location), an elevator call based on a communication of a passenger ID in conjunction with a hall call (such as a hotel room key swipe in conjunction with pressing an elevator call button in an elevator lobby), an elevator call based on a security credential (directly sent from a near field communication identification card, a radio frequency identification card, a smartphone (over Bluetooth, Wi-Fi, or cellular connection)), and a smartphone call entry; and/or an elevator call based on a biometric credential (facial recognition or finger print scan). The computing device of 106 can then associate the one or more passenger IDs to one or more social networks based on each passenger ID being linked to one or more social network/media IDs during an Opt-In operation.

At block 220, the intelligent building system 100 procures information with respect to the one or more passengers. For example, the intelligent building system 100 can procure the information from one or more social networks based on the one or more passenger IDs received at block 210. The information can be passenger preference information (e.g., passenger grouping suggestions and content preference suggestions) based on the social network/media IDs corresponding to the passenger IDs. The information can be procured by accessing databases or services every time the one or more passengers are identified with respect to an elevator call. The information can also be procured by accessing databases or services periodically. The databases or services can include a building-wide database (e.g., building tenant database or a corporate e-mail directory), a temporary database for hotel events, an intelligent building system 100 owned cloud-hosted database (which establishes a global reach of the intelligent building system 100), third party media sources, social media sources, social networks (e.g., Facebook, Myspace, LinkedIn, etc.), social network databases, microblog databases (e.g., Twitter, Snapchat, Instagram), employee databases, building directories, e-mail system address books, etc.

In an embodiment, the social network/media IDs can be used to access external databases or services of the social networks. The computing device 106 and/or other devices of the intelligent building system 100 can access these databases or services. Once access to the external databases or services by the computing device 106 is established, social network data of a passenger's social network profile can be mined by the computing device 106 (and/or other devices) for the passenger preference information. Examples of social network data include name, gender, age, height, weight, relationship status, company affiliation, job description, favorite sport team, favorite food, addresses, family members, friends, political affiliations, favorite movies, favorite animal, favorite type of sport/food/movie, etc. The social network data is mined by the computing device 106 for the passenger preference information. The mining operation of the social network data comprises querying of social network profiles and includes an analysis of the social network data of those profiles for each passenger. Note that passengers can belong to many social circles (e.g., groups) and will 'like' or 'tag' pages, photos, videos, posts, other users, etc. on social media sites that have content that appeals to passenger interests. The querying of social network profiles can include querying for these likes and tags (e.g., examining social media activity for page likes, albums, posts and tags as well as demographic information like age, sex, etc.). One or more social network profiles can be mined to obtain the social network data. Also, note that dates of access are also relevant, as it is more meaningful to provide content that is related to recent activity than to something tagged some time years ago.

The mining operation can enable the computing device of 106 to produce and store a local profile. The local profile is maintained and updated by the computing device 106. The local profile can be linked to the table described herein. For example, since preferences may not change from day to day, the local profile may store the social network data and/or the passenger preference information. Thus, the mining operation itself may be executed periodically, such as weekly, monthly, every sixth elevator call, etc. For instance, the information relevant to any passenger can be obtained from social media sources and periodically updated.

In an embodiment, a social networking platform can provide an application programmable interface that allows the intelligent building system 100 and/or an application running on a smartphone to access the passenger preference information. For instance, utilizing the application programmable interface, the social network platform can be queried for the passenger preference information, which is then stored by the intelligent building system 100 and/or the smartphone. In an operational example, a list of "likes" from Facebook can be procured, along with a name and/or keyword of each liked object (e.g., who likes who; who likes what; etc.). Then, undesirable content can be filtered and any remaining keywords can be fed to a content server requesting to get back content relevant to a passenger (or group of passengers). In this way, given three passengers where two of which 'liked' a first baseball team, one of which 'liked' a second baseball team, and each of which 'liked' a first ethnic food, a common thread between the three passengers is the first ethnic food.

Next, the process flow 200 proceeds to one or both of block 231 and 233. At block 231, the intelligent building system 100 procures content relevant to the information (e.g., passenger preference information of block 220). The content comprises single instance or combination information provided by different content forms, such as text, audio, images, animation, video and interactive content or and application capable of generating the content. The content can comprise text-only, sound-only, and image-only forms and/or a multimedia form. The content can be procured and/or provided from a media server, social networks, databases, etc.

Relevance of the content is a metric that defines how important content can be to a passenger. The computing device 106 can determine relevance by determining a list of content keywords, each with weights, derived from a passenger's preferences, and for multiple passengers, while also avoiding repeating the same content to passenger who rides elevators often. The computing device 106 can determine relevance by determining an overlap of common keywords with an aggregation of weights associated with time, accuracy, preference, location, etc. of the content. For instance, a video highlight of a baseball game from a previous night would receive a higher weight than a video highlight of a baseball game from a previous week.

Relevance can also include values associated with types of building, for example hotels, office buildings, and apartments. For example, industry news related to a passengers work may be more relevant to that passenger when utilizing an elevator at their office building, while traffic news may be more relevant to that passenger when utilizing an elevator at their apartment building. Note that determining relevant content can be performed by systems external to the intelligent building system 100 (e.g., social network platform). For example, the social media platform can utilize advertising technology to perform content selections.

In an embodiment, the computing device 106 can access a media server or the like to extract content relevant to the one or more passengers (using the passenger preference information of block 220). For instance, the computing device 106 identifies content on the media server that matches the content that has been liked or tagged on the social network profiles. In an example operation, if the passenger has liked an article relating to a sporting event (e.g., a baseball game) on a corresponding social network profile, then the computing device 106 can extract multimedia content (e.g., game highlights) from the media server that relates to the sporting event. Continuing with the above example, multimedia content related to the first ethnic food can be procured, rather than multimedia content related to the baseball teams.

In another embodiment, the computing device 106 can re-access the social networks to extract content relevant to the one or more passengers (using the passenger preference information of block 220). In another example operation, if the passenger has liked a post on a social network by a political candidate, then the computing device 106 can extract related posts from a microblog and highlights of recent speeches by the political candidate from the media server.

In another embodiment, the computing device 106 can procure content that is relevant to more than one passenger. That is, when the passenger preference information of a first passenger matches one or more additional passenger, the computing device 106 can determine that content that aligns with this passenger preference information is more relevant than other content. In this way, the preference suggestions can include common passenger preference information for groups of passengers that yield content that is mutually enjoyable.

At block 233, the intelligent building system 100 performs grouping operations relevant to the information (e.g., passenger preference information of block 220). Examples of grouping operations include assigning one or more passengers to ride with their friends/associates/people with common interests based on name, gender, age, relationship status, company affiliation, job description, favorite sport team, favorite food, addresses, family members, friends, political affiliations, favorite movies, favorite animal, and favorite type of sport/food/movie.

In an embodiment (based on the examples above), the two passengers who 'liked' the first baseball team can be grouped and assigned to a first elevator, while the one passenger who 'liked' the second baseball team can be assigned to a second elevator. Alternatively, since all three passengers 'liked' the first ethnic food, all three passengers can be grouped and assigned to the first elevator. In another embodiment, when one or more passengers are matched/linked/grouped to each other so that these grouped passengers can enjoy common content, the intelligent building system 100 can determine an impact on travel, waiting, and service times of other passengers. For instance, the intelligent building system 100 can determine that adding 30 seconds to a new passenger's journey so they can ride in the same car as a friend might not be desirable (while adding 5-15 seconds is desirable), and thus forgo that particular assignment of the new passenger.

At block 240, the intelligent building system 100 controls the elevator 103 based on blocks 231 and 233. Controlling the elevator 103 can include dispatching one or more elevators to collect groups of passengers and/or provide content for output devices 111 and 112. In an embodiment, the intelligent building system 100 can dispatch the elevator 103 to collect a passenger group of block 233. In another embodiment, the intelligent building system 100 can present the content of block 231.

In another embodiment, the intelligent building system 100 can dispatch the elevator 103 to collect the passenger group of block 233 while presenting the content of block 231. For example, the intelligent building system 100 provides content suited to the first baseball team to the two grouped passengers who 'liked' the first baseball team.

Figure 3:
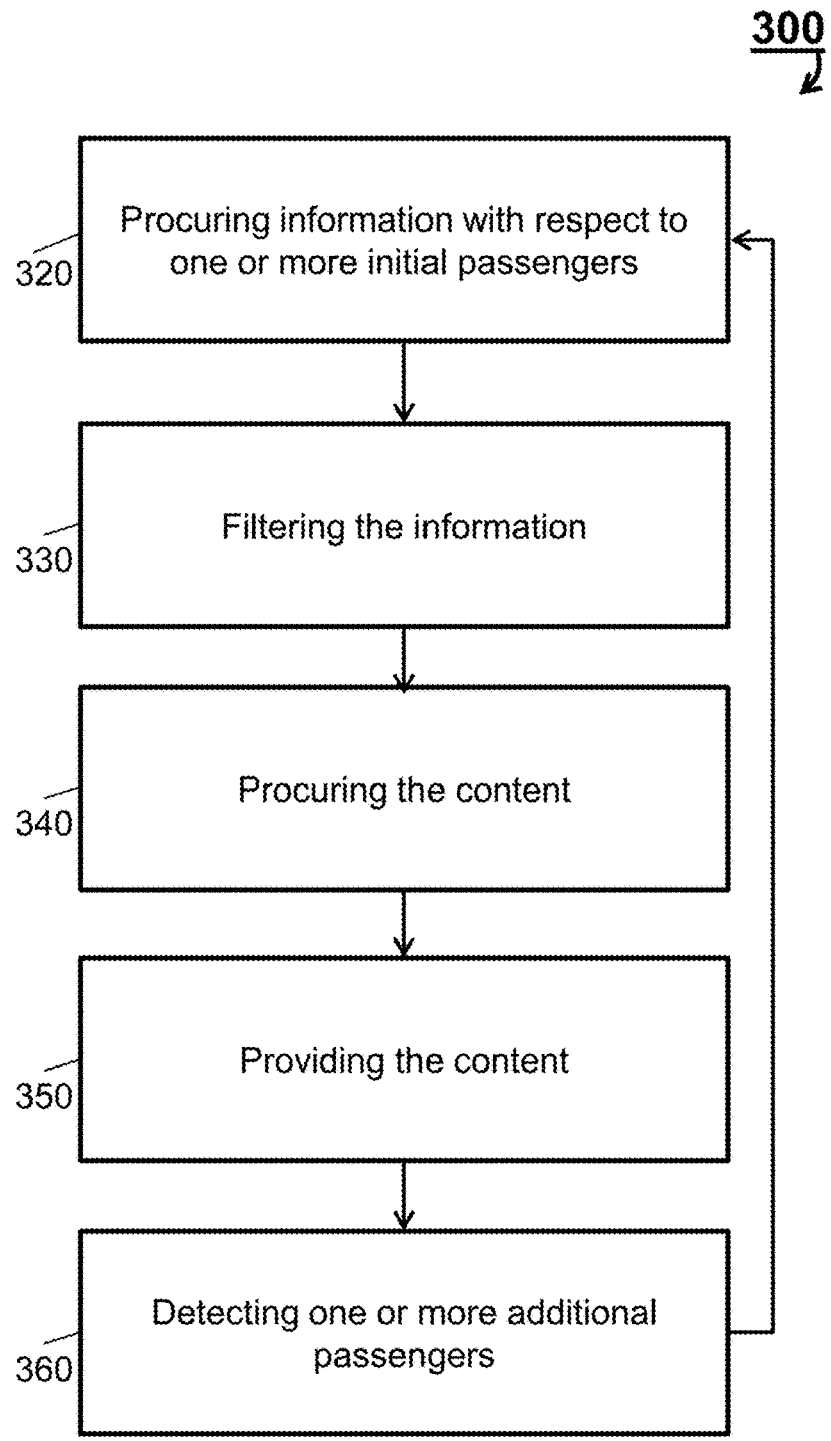
FIG. 3 illustrates a process flow for selecting and providing multimedia content based on passenger identification according to one embodiment.

Embodiments of selecting and providing multimedia content based on passenger identification will now be described. FIG. 3 is a schematic 300 of example operation of an intelligent building system 100. At dashed-block 320, the intelligent building system 100 procures information with respect to one or more initial passengers.

At block 330, the intelligent building system 100 filters the information (based on restricted information). For example, undesirable content, such as adult content, should not be displayed. The filtering can be based on building owner/tenant preferences, local expectations (e.g. in theme parks where certain content is for a competing product or in countries where certain content goes against local religious/societal laws), etc. For example, displaying advertisements for Bank of America may not be appropriate in a building where a major tenant is Wells Fargo. Further, if a building was in Chicago, two people from Philadelphia can be able to view content about the Phillies, while providing content for Chicago restaurants in lieu of content for Philadelphia restaurants. Thus, the intelligent building system 100 can create and maintain a list of pre-approved content and/or restricted information by analyzing possible content choices (based on user interaction over a period) and by automatically filtering the content choices.

At block 340, the intelligent building system 100 procures the content (e.g., similar block 231). In turn, at block 350, the intelligent building system 100 provides content to the elevator display 342 (e.g., similar block 240). Note that the passenger preference information can be matched to existing passengers and/or to media content playing on one or more displays (e.g., output devices 111 and 112) to assign passengers to one or more elevators (e.g., multimedia content and car assignments based on "mined" references). That is, because it is not ideal to stop playback of long-running content (e.g., anything over the average 45 second elevator ride) mid-elevator-trip to accommodate a newly boarded passenger who does not prefer that content, the computing device 106 can factor any currently-playing or scheduled multimedia for each elevator into the dispatching decision. In this way, embodiments herein can attempt to match passengers to content. If there is no passenger match to the currently playing or scheduled multimedia, the computing device can assign passengers to an elevator with neutral content playing, or to an idle elevator that doesn't have any content playing, in which case content most likely to be enjoyable to that passenger and to future passengers can be played. Additionally, the intelligent building system 100 can group passengers, such as by assigning new passengers with highly incompatible tastes to existing, already-assigned passengers to a second elevator playing more neutral content, or to an idle elevator that doesn't have any content playing, in which case content most likely to be enjoyable to that passenger and to future passengers can be played.

At block 360, the intelligent building system 100 detects one or more additional passengers. That is, if one or more additional passengers are detected, the process flow 300 can loop back to block 320 and repeat the operations based on the one or more additional passengers.

Figure 4:
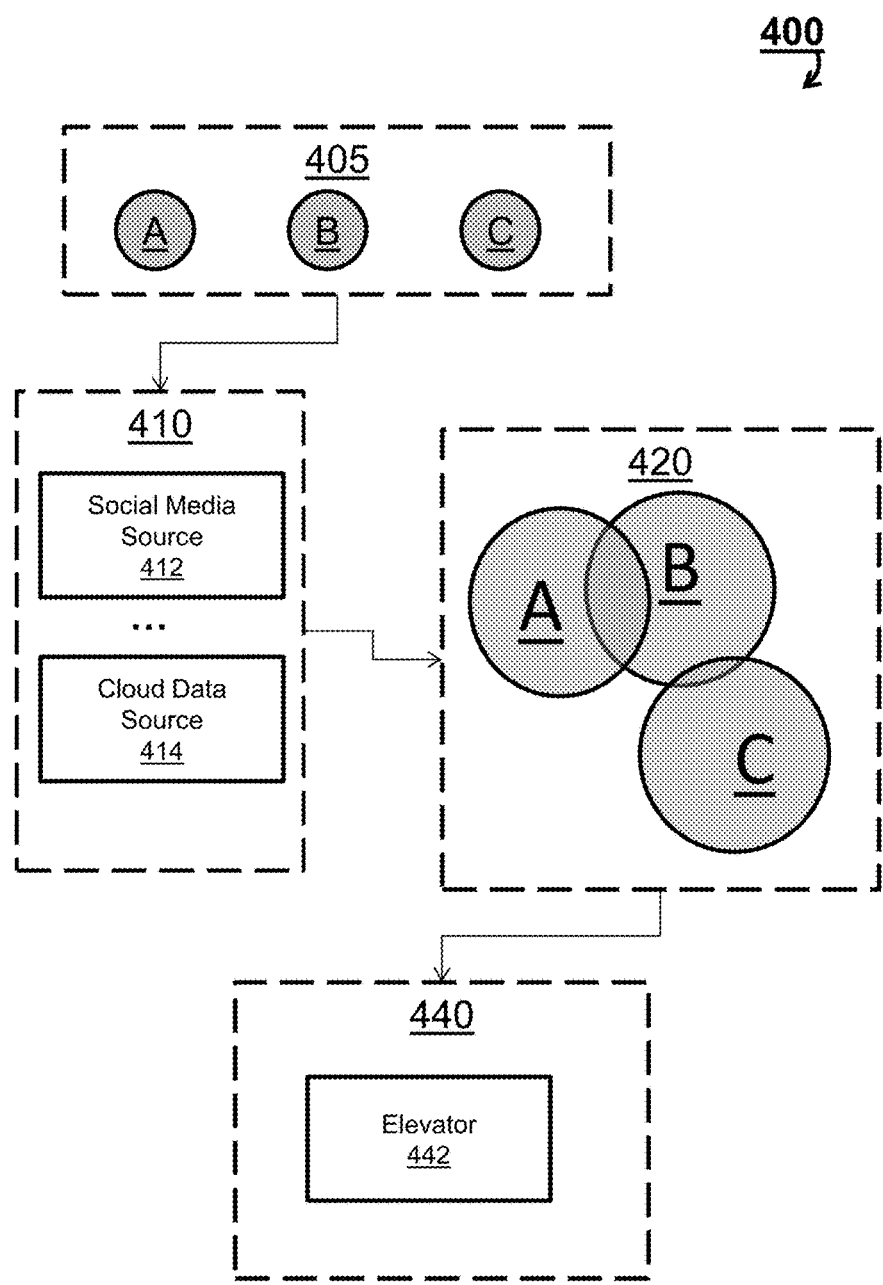
FIG. 4 illustrates a process flow for grouping passengers based on passenger identification according to one embodiment.

Embodiments of grouping passengers based on passenger identification will now be described. FIG. 4 is a process flow 400 of an intelligent building system 100. At dashed-block 405, one or more elevator calls and passenger identifications are executed. As shown in FIG. 4, one or more passengers A, B, and C executed the elevator calls. Each of the one or more passengers A, B, and C have previously 'Opted-In.' For example, passengers A and B have separately entered their elevator calls through corresponding mobile devices, while passenger C has swiped a security card before entering their destination or pressing the hall call button. The computing device 106 can procure passenger IDs from the mobile devices and the security card swipe.

At dashed-block 410, the computing device utilizes the procured passenger IDs to access passenger preference information (e.g., fixed profile and social network information) from one or more sources. The one or more sources can include a social media source 412 and a cloud data source 414. The social media source 412 can comprise social networks, microblog databases, etc. The cloud data source 414 can comprise company-wide databases and the like. The one or more sources can also include on-site and/or off-site data centers comprising company-wide databases and the like.

At dashed-block 420, the passenger preference information for each the passenger A, B, and C are matched to each other by the computing device 106 (e.g., similar block 233). For example, the computing device 106 can assign new passengers with highly compatible tastes to the same elevator. As shown in FIG. 3, passengers A and B have more overlapping tastes than passengers B and C, while passengers A and C have no common preferences. Thus, passengers A and B can be assigned by the computing device 106 to a first elevator. Passenger C, who has incompatible tastes to passengers A and B, can be assigned to a second elevator playing content more relevant to passenger C's interests. While the computing device 106 is described as performing the elevator assignment herein, in other embodiments a separate component of the intelligent building system 100 can perform passenger assignment.

At dashed-block 440, the intelligent building system 100 controls the elevator 103 based on the content and the one or more elevator calls (e.g., similar block 240). For example, the elevator can be dispatched to pick up (collect) passengers A and B. Additionally, the intelligent building system 100 can group passengers, such as by assigning new passengers with highly incompatible tastes to existing, already-assigned passengers to an idle elevator that doesn't have any passengers (e.g., determining whether already-waiting passengers are in the same social group(s) as newly-waiting passengers and/or whether currently-playing or scheduled multimedia is relevant to the newly-waiting passengers). For instance, with respect to the same social group(s), hotel elevators could group attendees at a conference that know each other or members of the same family staying on different floors into the same elevator based on passenger preference information. Further, during peak lunch-time down traffic, one elevator of an office building could pick up (collect) close friends waiting at several different floors based on passenger preference information. Also, passengers themselves can identify and input to the intelligent building system 100 (e.g., such as through a mobile device application) 'people I like to ride elevators with' to influence the dispatching decision. Note that periods of heavy traffic can override this passenger selection feature.

As an enhancement, grouping socially-linked passengers in the same elevator can occur when the "cost" of doing so is not excessive. If grouping socially-linked passengers in the same elevator unduly adds to the waiting, riding, or total service time of a passenger or passengers, then the intelligent building system 100 can keep passengers separated, despite close personal relationships. Thus, while heavy traffic periods are one such case where grouping friends might not be desirable (e.g. if it would add more than 5 seconds of extra time), lighter traffic periods might also be undesirable if an added time is 6-20 seconds or more.

Figure 5:
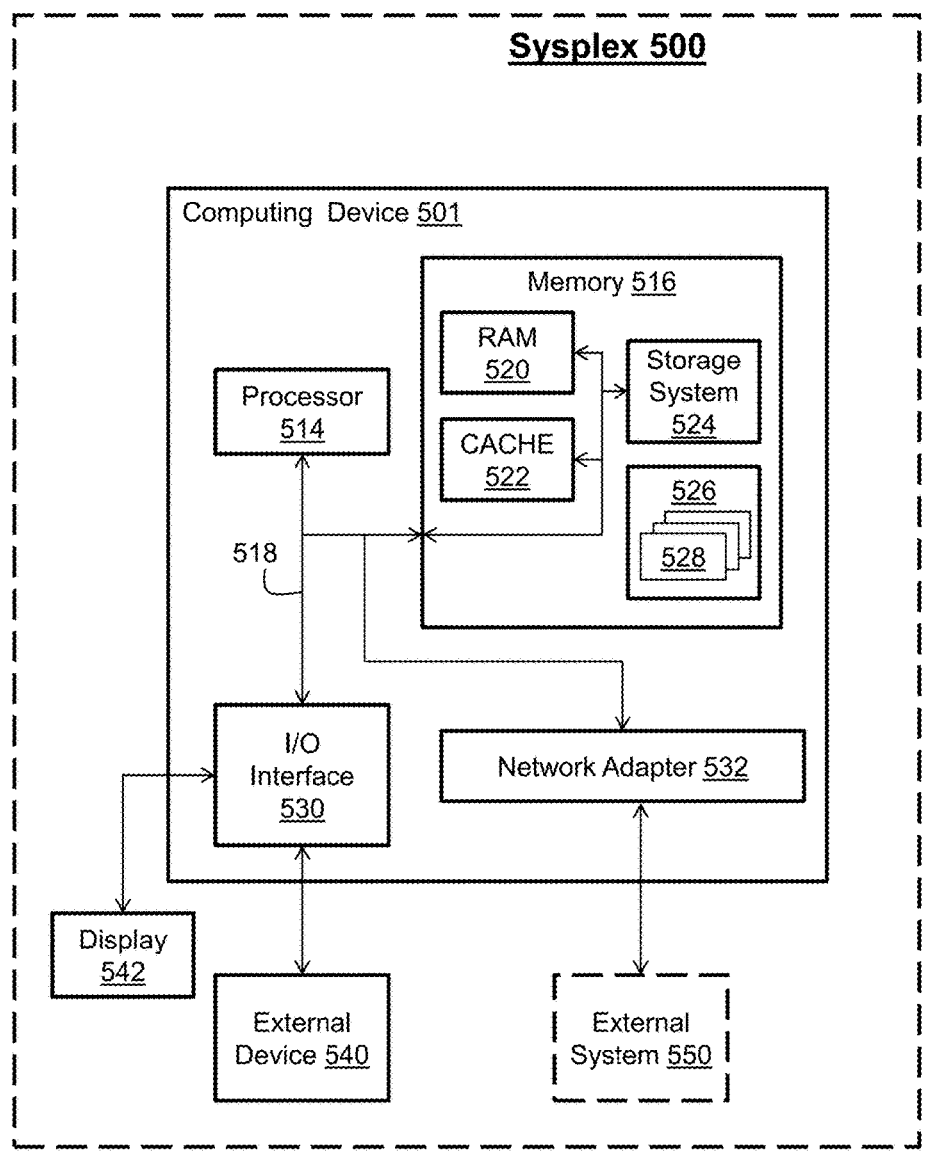
FIG. 5 illustrates a computing system schematic for selecting and providing multimedia content based on passenger identification according to one embodiment.

Referring now to FIG. 5, an example schematic of a sysplex 500 comprising a computing device 501 is shown. The computing device 501 is only one example of a suitable computing node within the sysplex 500 and is not intended to suggest any limitation as to the scope of use or operability of embodiments described herein (indeed additional or alternative components and/or implementations may be used). That is, the sysplex 500, computing device 501, and elements therein may take many different forms and include multiple and/or alternate components and facilities (such as a single computing device 106 performing one or more software operations; such as multiple different devices, each executing different process operations as seen in FIG. 4). Further, the computing device 501 may be any and/or employ any number and combination of computing devices and networks utilizing various communication technologies, as described herein. Regardless, the computing device 501 is capable of being implemented and/or performing any of the operations set forth hereinabove.

The computing device 501 can be operational with numerous other general-purpose or special-purpose computing system environments or configurations. Systems and/or computing devices, such as the computing device 501, may employ any of a number of computer operating systems. Examples of computing systems, environments, and/or configurations that may be suitable for use with the computing device 501 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, computer workstations, servers, desktops, notebooks, network devices, mainframe computer systems, and distributed cloud computing environments that include any of the above systems or devices, and the like.

The computing device 501 may be described in the general context of computer system executable instructions, such as program modules, being executed by a computer system. Generally, program modules may include routines, programs, objects, components, logic, data structures, and so on that perform particular tasks or implement particular abstract data types. The computing device 501 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computing device 501 is in the form of a general-purpose computing device that is improved upon by the operation and functionality of the computing device 501, its methods, and/or elements thereof. The components of the computing device 501 may include, but are not limited to, one or more processors or processing units (e.g., processor 514), a memory 516, and a bus (or communication channel) 518 which may take the form of a bus, wired or wireless network, or other forms, that couples various system components including to the processor 514 and the system memory 516. The computing device 501 also typically includes a variety of computer system readable media. Such media may be any available media that is accessible by the computing device 106, and it includes both volatile and non-volatile media, removable and non-removable media.

The processor 514 may receive computer readable program instructions from the memory 516 and execute these instructions, thereby performing one or more processes defined above. The processor 514 may include any processing hardware, software, or combination of hardware and software utilized by the computing device 501 that carries out the computer readable program instructions by performing arithmetical, logical, and/or input/output operations. Examples of the processor 514 include, but are not limited to an arithmetic logic unit, which performs arithmetic and logical operations; a control unit, which extracts, decodes, and executes instructions from a memory; and an array unit, which utilizes multiple parallel computing elements.

The memory 516 may include a tangible device that retains and stores computer readable program instructions for use by the processor 514 of the computing device 501. The memory 516 can include computer system readable media in the form of volatile memory, such as random access memory 520, cache memory 522, and/or the storage system 524.

By way of example only, the storage system 524 can be provided for reading from and writing to a non-removable, non-volatile magnetic media (not shown and typically called a "hard drive", either mechanical or solid-state). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As will be further depicted and described below, the memory 516 may include at least one program product having a set (e.g., at least one) of program modules that are configured to carry out the operations of embodiments. The storage system 524 (and/or memory 516) may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage system 524 may generally be included within the computing device 501, as illustrated, employing a computer operating system such as one of those mentioned above, and is accessed via a network in any one or more of a variety of manners.

Program/utility 526, having a set (at least one) of program modules 528, may be stored in memory 516 by way of example, and not limitation, as well as an operating system, one or more application programs, other program modules, and program data. Each of the operating system, one or more application programs, other program modules, and program data or some combination thereof, may include an implementation of a networking environment. Program modules 528 generally carry out the operations and/or methodologies of embodiments as described herein (e.g., the process flows 200 and 300).

The bus 518 represents one or more of any of several types of bus structures, including a memory bus or memory controller, a peripheral bus, an accelerated graphics port, a storage bus, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (e.g., peripheral component interconnect express).

The computing device 501 may also communicate via an input/output (I/O) interface 530 and/or via a network adapter 532. The I/O interface 530 and/or the network adapter 532 may include a physical and/or virtual mechanism utilized by the computing device 501 to communicate between elements internal and/or external to the computing device 501. For example, the I/O interface 530 may communicate with one or more external devices 540 (e.g., a user device of a passenger), such as a keyboard, a pointing device, a display 542 (e.g., the output devices 111 and 112), etc.; one or more devices that enable a user to interact with the computing device 501; and/or any devices (e.g., network card, modem, etc.) that enable the computing device 501 to communicate with one or more other computing devices. Further, the computing device 501 can communicate with one or more networks such as a local area network (LAN), a wide area network (WAN), and/or a public network (e.g., the Internet) via network adapter 532. Thus, I/O interface 530 and/or the network adapter 532 may be configured to receive or send signals or data within or for the computing device 106. As depicted, the I/O interfaces 530 and the network adapter 532 communicates with the other components of the computing device 106 via the bus 518. It should be understood that although not shown, other hardware and/or software components could be used in conjunction with the computing device 501. Examples, include, but are not limited to: microcode, device drivers, redundant processing units, external disk drive arrays, RAID systems, tape drives, and data archival storage systems, etc.

While single items are illustrated by the Figures, these representations are not intended to be limiting and thus, any items may represent a plurality of items. In general, computing devices may include a processor (e.g., a processor 514 of FIG. 5) and a computer readable storage medium (e.g., a memory 516 of FIG. 5), where the processor receives computer readable program instructions, e.g., from the computer readable storage medium, and executes these instructions, thereby performing one or more processes, including one or more of the processes described herein.

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The technical effects and benefits of embodiments herein include (e.g., not requiring explicit/direct user entry) catering to long-duration content playback and/or catering to elevator dispatching algorithm changes by considering social factors when assigning each passenger to an elevator, thereby avoiding negative ride experiences. The technical effects and benefits of embodiments herein also include enabling friends/family/acquaintances to ride together more often during times where elevator optimization is not critical and to be grouped where possible during peak usage times as long as this does not adversely affect overall performance. Embodiments herein, as implemented and/or claimed, improve the functioning of a computer and/or processor of an elevator itself by enabling an automatic selection of multimedia content by using a social network to mine passenger preferences in real time, without any form of direct control by user(s). The embodiments herein improve upon existing building and elevator schemes that struggle with putting relevant content on screens in elevators due to those schemes having no way to drive passenger relevant content and therefore comprising a disconnect between passenger and content. Thus, perception of waiting time can be reduced (as passengers are occupied by relevant content and/or spending time with friends/family/acquaintances while waiting for or riding in an elevator).

The intelligent building system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of building system and method.

Aspects are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flow diagrams depicted herein are just one example. There may be many variations to this diagram or the steps (or operations) described therein without departing from the spirit of this disclosure. For instance, the steps may be performed in a differing order or steps may be added, deleted or modified. All of these variations are considered a part of the claims.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of controlling one or more elevators by an intelligent building system, the method comprising:
   receiving, by the intelligent building system comprising a processor coupled to a memory, one or more elevator calls initiated by one or more passengers, each elevator call comprising a passenger identification corresponding to a passenger initiating the elevator call;
   procuring, by the intelligent building system in response to each of the one or more elevator calls, passenger preference information based on each passenger identification;
   grouping, by the intelligent building system, the one or more passengers with respect to the passenger preference information to produce one or more passenger groups; and
   controlling, by the intelligent building system, the one or more elevators to collect the one or more passenger groups,
   wherein the passenger preference information is procured from one or more social media sources based on a mining operation,
   wherein the mining operation enables production of one or more profiles storing preferences of the one or more passengers,
   wherein the mining operation is executed periodically obtain preference updates for the one or more profiles from the one or more social media sources.

2. The method of claim 1, comprising receiving an opt-in input from each passenger.

3. The method of claim 1, comprising filtering the passenger preference information based on a list of pre-approved content or restricted information.

4. The method of claim 1, comprising:
   procuring content with respect to the passenger preference information; and
   controlling one or more output devices of the intelligent building system to provide the content to the one or more passenger groups in conjunction with controlling the one or more elevators to collect the one or more passenger groups.

5. A method of controlling one or more output devices by an intelligent building system, the method comprising:
   receiving, by the intelligent building system comprising a processor coupled to a memory, one or more elevator calls initiated by one or more passengers, each elevator call comprising a passenger identification corresponding to a passenger initiating the elevator call;
   procuring, by the intelligent building system in response to each of the one or more elevator calls, passenger preference information based on each passenger identification;
   procuring, by the intelligent building system, content with respect to the passenger preference information; and
   controlling, by the intelligent building system, the one or more output devices to provide the content,
   wherein the passenger preference information is procured from one or more social media sources based on a mining operation,
   wherein the mining operation enables production of one or more profiles storing preferences of the one or more passengers,
   wherein the mining operation is executed periodically obtain preference updates for the one or more profiles from the one or more social media sources.

6. The method of claim 5, comprising receiving an opt-in input from each passenger.

7. The method of claim 5, comprising filtering the passenger preference information based on a list of pre-approved content or restricted information.

8. The method of claim 5, comprising:
   grouping the one or more passengers with respect to the passenger preference information to produce one or more passenger groups; and
   controlling one or more elevators of the intelligent building system to collect the one or more passenger groups in conjunction with the controlling of the one or more output devices to provide the content.

* * * * *